June 5, 1956 — D. E. CLAPP — 2,749,406
THERMAL WATTAGE CONTROLLER
Original Filed Sept. 11, 1951 — 2 Sheets-Sheet 2
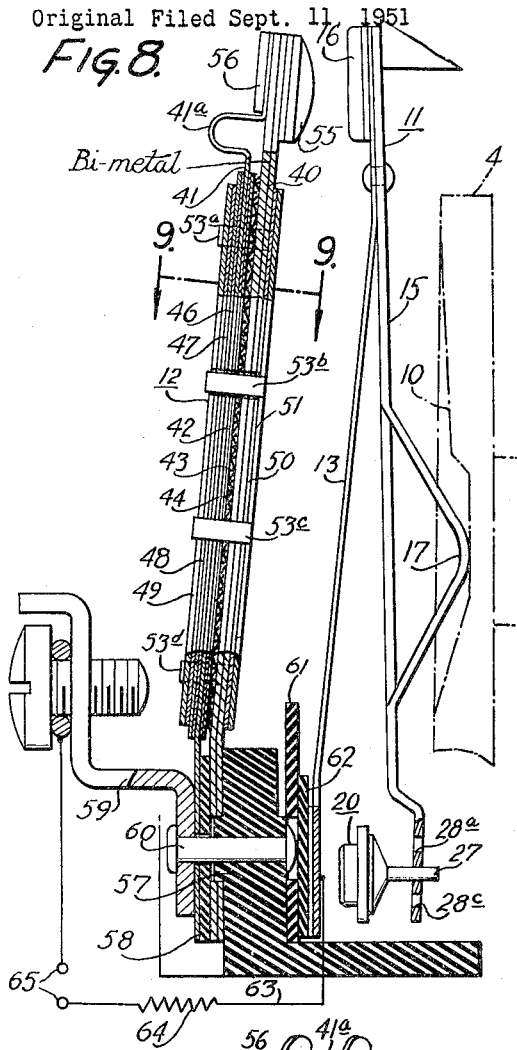
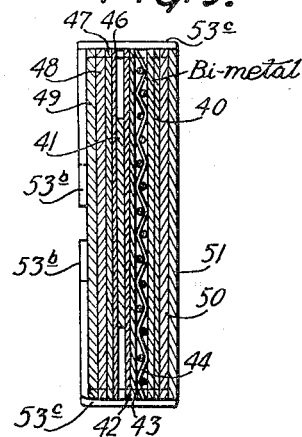
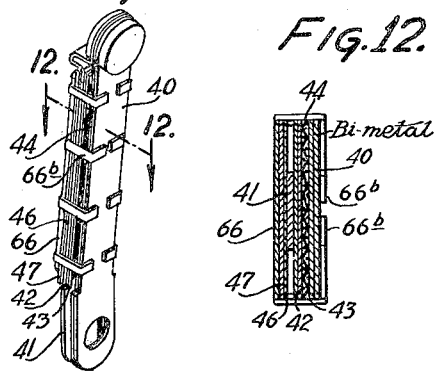
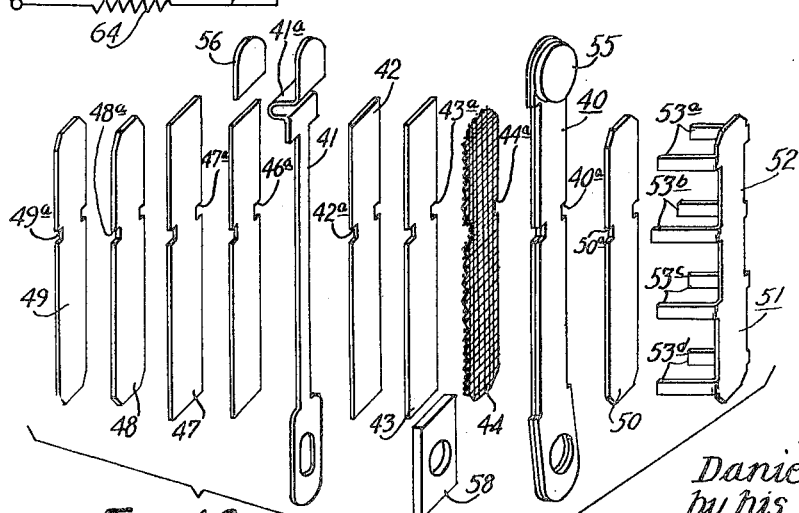
Inventor: Daniel E. Clapp
by his Attorneys
Howson & Howson

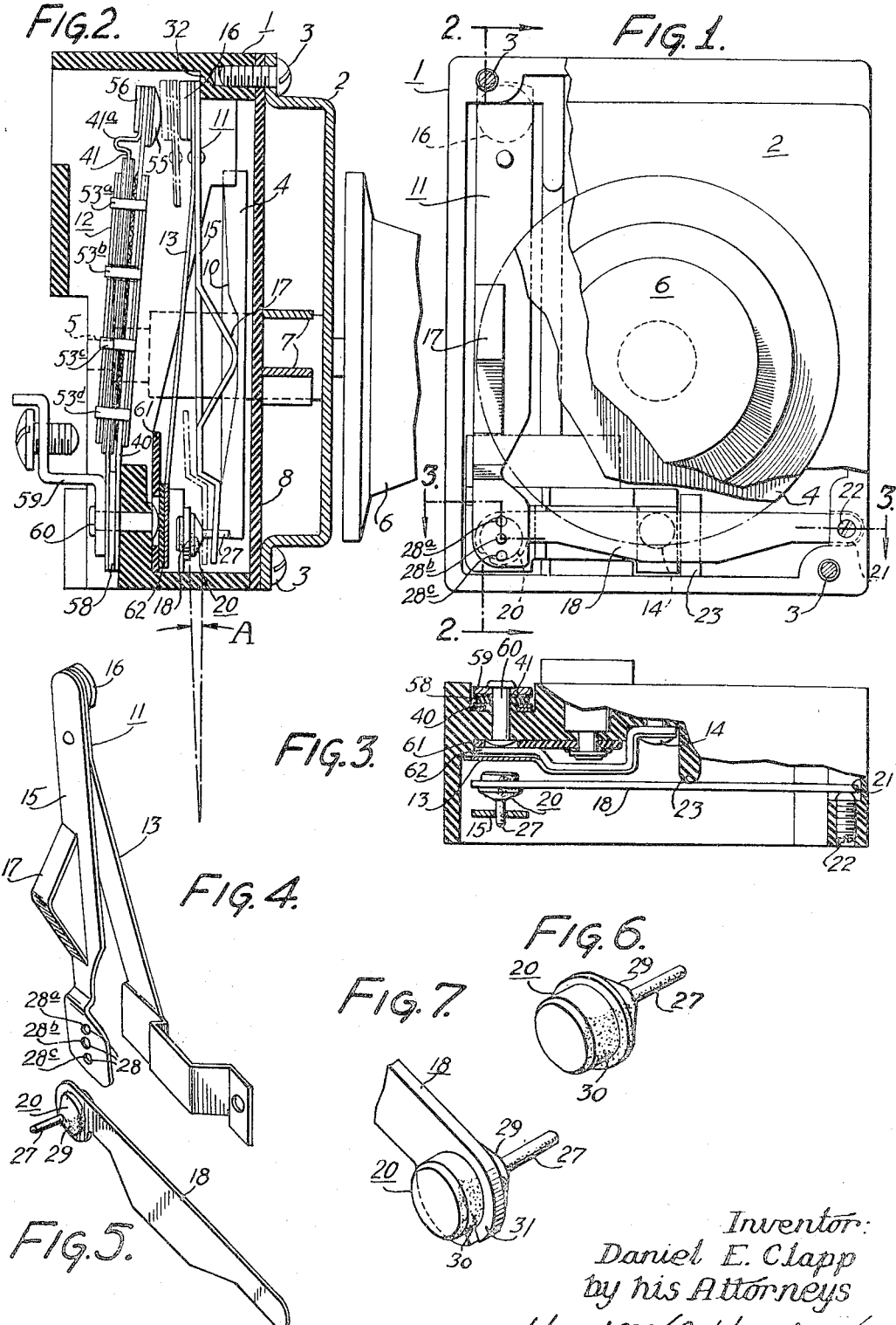

United States Patent Office 2,749,406
Patented June 5, 1956

2,749,406

THERMAL WATTAGE CONTROLLER

Daniel E. Clapp, Philadelphia, Pa., assignor to Proctor Electric Company, Philadelphia, Pa., a corporation of Pennsylvania Original application September 11, 1951, Serial No. 246,098, now Patent No. 2,673,444, dated March 30, 1954. Divided and this application July 8, 1953, Serial No. 371,350

4 Claims. (Cl. 200—113)

This application is a division of application Serial No. 246,098, filed September 11, 1951, now U. S. Patent No. 2,673,444, dated March 30, 1954.

The present invention is directed to thermal wattage controllers used for controlling an electric heating load such as an electric range surface heating unit. More particularly, the invention relates to a device of the type that controls the energization of an electrical heating load by the cyclic make and break of the circuit thereto. A device of this general type has been disclosed and claimed in the copending application of W. H. Vogelsberg, Wattage Controller, U. S. Serial No. 157,932, filed April 25, 1950, now U. S. Patent No. 2,623,137, dated December 23, 1952, and the present invention represents an improvement particularly applicable to this type of device.

In that device, it was noted that slight variations in the manually adjustable control cam, which is adapted to adjust the control element to afford wattage levels, resulted in an error in the span of the wattage levels when going through an entire range of inputs. Thus, for example, in a controller originally designed to provide a zero to 100% range of input, a span error of +10% would give 55% input at the 50% position and 88% input at the 80% position. Other factors, such as variations in the electrical resistance of the heater that actuates the thermal controller, tolerances in the flexivity of the bimetal thermomotive members and other design elements of the thermostat, were found to contribute to span errors.

A first object of this invention is the provision of a novel arrangement for providing an adjustment in the span of wattage inputs to be effected by the controller.

Another well-recognized problem in thermal wattage controllers of the general type above-mentioned is the relatively long total cycle length (i. e. the sum of the "on" and "off" energization intervals) at the extremely low and high input positions, in comparison to the rather short total cycle lengths in the medium range of positions. Heretofore, it has been necessary to compromise in design and tolerate, for example, a cycle time as high as 2.5 minutes for an 8% input position with as low a cycle time as .5 minute at the 55% input position. If the 55% input time was raised to .6 minute the cycle time for the 8% position would be as high as 3.25 minutes.

A further object of this invention is to improve this condition and to minimize the disparity between the overall cycle lengths when going from one wattage level to another.

There also has been the problem of obtaining consistency between various samplings of thermostats in mass production. This situation has been found to be greatly aggravated by small variations in the heat transfer rates and the general coupling between the various members that comprise the thermostatic member. The present invention represents a discovery which has greatly obviated this problem.

The present invention also provides a novel thermostatic switch construction that is readily adaptable to mass production techniques and that is inherently more reliable and predictable in its characteristics.

Referring now to the drawings:

Fig. 1 is a front view of a switch structure with the cover broken away to show various elements with which the present invention is concerned;

Fig. 2 is a sectional elevation taken along line 2—2 of Fig. 1;

Fig. 3 is a sectional view taken along line 3—3 of Fig. 1;

Figs. 4 and 5 are isometric views of the adjustable blade and compensating member of the wattage controller;

Figs. 6 and 7 show details of the adjustable insulating button that cooperates with these members;

Fig. 8 is an enlarged sectional view of the wattage controller, similar to Fig. 2;

Fig. 9 is a cross-sectional view taken along line 9—9 of Fig. 8;

Fig. 10 is an exploded view of the thermostat assembly;

Fig. 11 is a perspective view of a modified form of the thermostat assembly; and Fig. 12 is a cross-sectional view taken along line 12—12 of Fig. 11.

The present invention is applicable to the thermal wattage controller shown in Fig. 1, which is generally similar to that shown in the aforementioned Vogelsberg patent and also in W. H. Vogelsberg's copending application U. S. Serial No. 157,933, filed April 25, 1950, now U. S. Patent No. 2,666,124, dated January 12, 1954. For a full description of this switch, reference may be made to those patents. Only that structure dealing specifically with the wattage controller improvements will be dealt with herein.

For the purpose of this discussion, it should be mentioned that the controller as specifically applied is in series with the heating load, i. e. any auxiliary heater for effecting control of the switch is in series with the heating load and the electrical contacts controlled by the switch are also in series with said load. Of course, any variations in this circuit or other details which do not depart from the spirit of this invention are considered within the scope thereof.

Figs. 1 and 2 show a switch case 1 made preferably of an insulating material, such as Bakelite, having disposed thereon a cover member 2 which is held in fixed relation by suitable fastening means 3. Cover member 2 forms one support for control cam 4, while the switch case 1 has a pilot hole 5 formed therein to support the rear end of control cam 4. A manual control knob 6 having suitable indicia (not shown) is used for setting the control cam 4 to obtain a plurality of wattage levels at the heating unit. Where desirable, a detent arrangement indicated generally by the numeral 7 is used for indexing the control cam at any desired position. The detent positions can be arranged to correspond to specific throws of cam 4 and correlated to various input levels. The details of such a detent construction 7 and cam throws for particular positions are shown in the aforementioned Vogelsberg U. S. Patent No. 2,666,124. An insulating barrier member 8 is disposed between the cover member with its detent construction and the various switch members in the switch case 1.

Control cam 4 is provided with a race 10 in an annular area adjacent the periphery of said cam. The cam race 10 when rotated by the manual control member 6 acts to displace an adjustable member 11 and in turn prestresses a thermostatic control member 12. Adjustable member 11 includes a generally L-shaped support spring 13 which is made preferably of high conductivity spring material such as beryllium copper and is secured near the center of the switch case 1 through a rivet 14. The top end of said spring member has secured thereto a rigid metallic member 15 and an electrical contact member 16. Member 15 has formed thereon a lanced portion 17 and is biased by spring member 13 into contact with race 10 of cam 4 through said lanced portion 17. The lower free end of member 15 engages a bimetallic ambient temperature compensator strip 18 through insulating button 20. Compensator 18 extends across the bottom of the switch and has one end disposed in a recess or opening 21 in the switch case (see Figs. 1 and 3), while an adjusting screw 22 adjusts the compensator laterally. The center of said compensator is supported on a fulcrum 23 formed in said switch case. The insulating button 20, shown enlarged in Figs. 6 and 7, is preferably made of nylon for its insulating and strength properties and has formed thereon an extension or pin 27 for insertion into one of a plurality of holes 28 provided at the lower end of member 15. The button has a conical surface 29 disposed adjacent the extension 27, and a reduced diameter boss 30 adapted to be clamped and held by the apertured and bifurcated end 31 of compensator 18.

The ambient temperature compensator 18 is arranged with its high expansion side toward the rear of the switch case, while thermostatic control member 12 is adapted to flex generally toward the left on heating as viewed in Fig. 2. Thus an increase in ambient temperature will result in movement of the free end of compensator (button 20) toward the right and in turn move the free end of member 11 toward the left, to thereby correct for movement of the top of member 12 toward the left under the influence of the same ambient.

Fig. 2 (solid line) shows the various members of the wattage controller in their "off" position. Blade 15 abuts at its upper end a stop 32 on the switch case and has its lanced portion 17 arranged to ride in the "off" depression in cam race 10. The lower end of blade 15 is separated from the free end of compensator 18 but the extension 27 still rides in one of the holes 28. Rotation of manual control knob to one of the input positions results in movement of member 11 into engagement with the conical surface of button 20 at its lower end and into engagement with member 12 at its top end. It will be noted that there is sufficient length of projection 27 of button 20 so that movement of the adjustable blade 11 from any of the "on" positions to the "off" position will not cause said projection to leave the particular hole 28 in which it had been placed.

As described in the aforementioned Vogelsberg U. S. Patent No. 2,623,137, the adjusting screw 22 serves as a means by which to correlate wattage input and the control cam and knob, which is generally known in the art as a "zero" adjustment. With the knob at a particular point, the screw 22 may be adjusted to move strip 18 and member 15 so as to properly position contact 16 for that setting of the knob. For example, the point at which the knob is set may correspond to an extrapolated zero input point on the cam, at which the contacts should just engage.

In accordance with the present invention, adjustment for the span of the wattage for any particular design of the control cam race is effected by positioning of button projection 27 into one of the holes 28 provided in the lower end of adjustable blade 11. Change of adjustment is accomplished by flexing member 15 sufficiently to free pin 27 and then moving the compensator to align pin 27 with another hole, after which member 15 is released to permit entry of pin 27 into the other hole. This adjustment is performed with the cover and control cam removed. The span adjustment varies the point of support between the compensator 18 and the adjustable blade 11, thereby changing the lever distance between the lanced portion 17 of adjustable blade 11 which bears on the cam and the bearing point on the compensator. The adjustment for span is such that when extension 27 is moved from the center hole 28b to the lower hole 28c, there is a decrease in the input and a general contraction in the span of operation. Movement of projection 27 from hole 28b to hole 28a provides results in an increase in the span. The general effect of this adjustment is to change the amount of movement of the adjustable blade 11 when measured at contact 16 for a given throw by control cam race 10. In one embodiment of this device, using a compensator and thermostatic member similar to those of the aforementioned applications, a movement of $\frac{1}{16}$" upward from hole 28b to hole 28a results in a 6% increase in the span. Thus the 50% input position on the control cam would be increased 3% in value.

It will be noted from Fig. 2 that there is an angular disposition noted generally as angle A, between the flat portion of member 15 on which the adjustable button bears and the remainder of this member. This is to assure that any adjustment of span will not affect the adjustment provided by screw 22. By way of example, the adjustment of screw 22 may be made at the position where the switch contacts should just engage. Adjustable blade 11 is in this position in the dotted line showing of Fig. 2. In this position, the angle A is such that the lower flat portion of member 15 will be disposed vertically when the contacts just engage. Therefore, movement of button 20 between any of the holes 28 will not affect the distance between the compensator and the lower flat portion of member 15. It will be appreciated that using the initial engagement position of the contacts for correlation or "zero" adjustment is an arbitrary choice, and that it is possible to use any other position such as the 20% input position for this adjustment. Under these circumstances the angle A would be altered accordingly.

It should be pointed out that the span adjusting arrangement is primarily provided for variations in the cam. However, it will take care of errors in design factors of thermostat member 12, such as the thermomotive characteristics and the resistance of the heater associated with the thermomotive member. When the error in span can be directly attributed to bimetal flexivity, the method of adjustment provided herein is especially advantageous. Thus if the flexivity of the bimetal of thermostatic member 12 is higher than its nominal valve, a decrease in span will be evident and an additional error will be noted because of an inherent reduction in ambient compensation effect. It can be seen that by moving the adjusting button 20 from the center hole 28b to the upper hole 28a, that the error in span will be corrected and that this adjustment will also be in the direction for correction of the error in ambient compensation.

Referring now to Figs. 8 to 10, the thermostatic member 12 is shown to comprise a bimetallic member 40, a heater 41, members 42, 43 and 44 disposed between the heater and the bimetallic member, with members 46 to 49 disposed on the back of the heater and members 50 and 51 on the back of bimetallic member 40. The interposed members are generally rectangular strips notched at 42a, 43a and 44a respectively. In one particular embodiment, member 42 is a .001" strip of mica, member 43 is a .005" strip of high grade asbestos, generally known as Quinterra, while member 44 is a 30 mesh wire screen of approximately .015" wires which has been calendered to a standard thickness of .027". In the same embodiment, member 46 on the back of the heater, is a mica strip of .001" thickness, member 47 is a Quinterra strip of .005" thickness, while members 48 and 49 are brass shims of .010" thickness, each. These members are similarly notched at 46a, 47a, 48a and 49a, respectively. Member 50 adjacent the rear of bimetal 40 is a brass shim similar to 48 and 49, while member 51 is a .010" brass shim having a generally rectangular body portion 52, and fingers 53a to 53d arranged for clamping the entire assembly. Fingers 53b prevent a shifting of the shim members by cooperating with the notches provided along the length of these various members. Notches 40a in bimetallic member 40 determine the vertical positioning of the members. Pressure provided by fingers 53a to 53d maintains the various members in a reliable and reproducible heat transfer and mechanical relation. In actual practice, the fingers may be turned either manually or by the use of a suitable fixture with attendant reliability. Bimetallic member 40 in this embodiment is of the type designated by the trade as X–499, and is .030" thick. The heater 41 is of Nichrone having a necked-down active portion measuring .096" wide and .0051" in thickness. An offset loop 41a is provided near the top end of heater 41 for a purpose to be described presently, and the heater is secured to the top of bimetal 40. In manufacture, this securing operation is performed simultaneously with the affixing of a contact 55 by projection welding to the free end of bimetal 40. For this purpose a projection welding button 56 is used on the rear of the heater.

The switch case is provided with a boss 57 to locate the lower end of bimetal 40, and an insulating spacer 58 is disposed between the lower end of heater 41 and said bimetal. A terminal member 59 is located adjacent the heater 41 and the entire assembly is secured to the switch case 1 through a rivet 60. This rivet is isolated from spring 13 of the adjustable member by insulating strips 61 and 62.

The circuit through the switch extends from the terminal 59 through the heater 41 to contact 55, through adjacent contact 16 and thence through spring 13 to an external connection represented at 63. The heating load to be controlled, as represented at 64, is serially included in the energizing circuit whose input terminals 65 are connected to a suitable source of electrical energy.

The mode of thermostat operation is such that during the first flow of current through heater 41, rapid expansion of said heater take place, and this acting through loop 41a effects movement of the thermostatic member toward the right so that contact 55 is pushed into further engagement with contact 16. On continued energization of the heater 41, the heat will flow through the interspaced members 42, 43 and 44 to bimetal 40. This heat will cause the bimetal to flex toward the left (the high expansion side of said bimetal being on the right side as in Fig. 8) until separation of contacts at 55 and 16 takes place. Heater 41 being of relatively low mass will cool and contract rapidly and will immediately effect augmented opening of contacts 55 and 16. On further cooling of the thermostat, bimetal 40 will carry contact 55 into engagement with contact 16 to start a second cycle of operation. As brought out in the aforementioned application, the thermomotive effect, as provided by heater 41, results in excellent contact life and reduces radio interference, etc. As also brought out in that application, the offset 41a in the heater permits longitudinal force transmission to the end of the bimetal without suffering overstress. Among other advantages, it also is a design variable for controlling the cycle length.

The use of the wire cloth material 44 as the main interspacing material between heater 41 and bimetal 40 has been responsible for the extreme reliability between successive samples of thermostats of this general construction. Heretofore, use of an interleaving material solely of asbestos and/or mica has resulted in thermostatic members which varied from one sample to another. Critical control of the compaction pressures on the asbestos and the criticality of the clamping pressures holding the assembly together tended toward expensive testing precedures for sorting the thermostats. The use of the screening has obviated this problem. One theory, which has been postulated to explain this increased reliability, is the use of the medium of radiation type heat transfer between the heater or its immediately adjacent elements and the bimetal. Of course, it is entirely possible that the radiation transfer is not merely through the interstices of the screening but may be between the surface of the heated screening material and the bimetal. Another theory is that reliability is evident because heat transfer by conduction to and from the screening material takes place through a multiplicity of small areas of contact, and that a substantial variation in clamping pressure does not affect the heat transfer. Another factor which may contribute to the reliability is that a major portion of the thermal resistance to conduction heat transfer is along the relatively long skew path of the individual corrugations in comparison to the small resistances at the small areas of contact at the ends of the corrugations. Further, the calendering of a piece of screening or other material made up of a member or members of general serpentine configuration, is much more effective, apparently, than attempting to calender a sponge-like material such as asbestos.

The mica shims 42 and 46 provide a hard wear-resisting surface to permit relative movement of the heater 41 and the remainder of the assembly. The asbestos members 43, 47 are provided for electrical insulation between the conductive heater and the adjacent members.

The brass shims 48 to 51 provide a flexible mass for storing thermal energy. Shim 51 additionally serves as a convenient clamping member and it also cooperates with shims 48, 49 to hold the heater 41 flat against the remainder of the assembly and thereby preventing it from buckling. It has been found that distribution of the shims is particularly important, especially when the device is to be used in conjunction with flashing or any type of over-energization of a heating unit for any given length of time, with subsequent reduced energization at a given average wattage level. The above-described thermostat is adapted for use in timing the interval of over-energization and for controlling the average wattage input thereinafter. The thermostat, when used in a flashing operation, to provide a flash time of 30 seconds at maximum input, will have a cycle time of 1.9 minutes when the input is set at 8%, and will provide a cycle time of .6 minute at 55% wattage input. This may be compared to previous attempts which gave a 2.5 minute cycle time at 8% input and a .5 minute cycle time at the 55% input. Thus, the present thermostat has been capable of substantially reducing the cycle time at the lower inputs, while raising the cycle time at the medium range of inputs. In connection with the flashing time, it has been found that the construction shown in Figs. 8 to 10 is particularly advantageous in being a thermal memory storage member, for these thermostats are used to protect the heating unit in preventing indiscriminate repeated overheating of the heating unit with possible burning out of the same.

As brought out above, the distribution of the metal shims has been found to affect the optimum performance. For instance, it was found that placement of all the metal shims on the back of the bimetal 40 resulted in a lowering of the flash time, and thus more mass of shims were required to bring the timing function to its desired value. If the entire mass of shims were placed between the heater 41 and the bimetal 40, the cycle times increased at the high and low inputs with a lowering of the cycle time at medium range. On the other hand, if the entire mass was placed on the heater side, a non-linear movement of the thermomotive member was experienced with a consequent non-linear "tracking" of the heating load by the thermostat. This defect would be especially noticeable during any reenergization of the heating load before the latter had cooled from a previous energization period.

Figs. 11 and 12 show an alternate embodiment of the thermostat. This construction is especially useful when thermal memory storage capacity is not required of the thermostat. This construction is similar to that of Figs. 8 to 10 in that the bimetal 40, the heater 41 and the intervening members, i. e. the mica shim 42, the asbestos insulating member 43 and the screen 44 are the same. Similarly on the outer side of heater 41 are disposed the mica shim 46 and the asbestos insulating strip 47. However, a brass clamping member 66, similar to member 51, is also disposed on the outer side of the heater 41. The clamping member serves to hold the members in predetermined mechanical and thermal orientation, while the rectangular body portion of this clamping member serves to prevent the heater from buckling. Notches are provided in these members, as in the previous embodiment, to align the various members vertically. In both embodiments, the bimetallic member is used to support all of the members through the cooperating notches. It will be noted that the necked-down portion of the heater provides a clearance for the clamping fingers 53b or 66b of either members 51 or 66 of the respective embodiments. It is pointed out that the removal of the additional mass of shims does not change the desirable cycle length relationships of the former embodiment.

While certain embodiments of the invention have been illustrated and described, the invention is not limited thereto but contemplates such modifications and further embodiments as may occur to those skilled in the art.

I claim:

1. In a wattage input controller operable over a range of inputs, a manually adjustable cam for selecting a wattage input within said range, an adjustable member fulcrumed on said cam, thermomotive means adapted to be prestressed by said member so as to provide a predetermined wattage input, said thermomotive means including a current conducting element, current-controlling contacts controlled by said thermomotive means and serving to control flow of current to said element, an ambient compensating member adapted to bear against said adjustable member to vary its position in accordance with ambient temperature changes, and means for varying the point of contact of said compensating member with said adjusting member to correct for errors in range of input as controlled by said cam.

2. In a wattage input controller operable over a range of inputs, a manually adjustable cam for selecting a wattage input within said range, an adjustable member fulcrumed on said cam, thermomotive means adapted to be prestressed by said member so as to provide a predetermined wattage input, said thermomotive means including a current conducting element, current-controlling contacts controlled by said thermomotive means and serving to control flow of current to said element, an ambient compensating member adapted to bear against said adjustable member to vary its position in accordance with ambient temperature changes, means for adjusting said compensating member to correlate the input range with said cam, and means for varying the point of contact of said compensating member with said adjusting member to correct for errors in range of input as controlled by said cam.

3. A wattage input controller according to claim 3, wherein the general planes of said members are substantially parallel.

4. A wattage input controller according to claim 3, wherein the plane of adjustment of said compensating member and the plane of the cooperating surface on said adjustable member are parallel in the correlation adjustment position, whereby the adjustment to correct for errors in range of input may be effected without change of the correlation adjustment.

References Cited in the file of this patent

UNITED STATES PATENTS

| | | |
|---|---|---|
| 2,207,634 | Myers et al. | July 9, 1940 |
| 2,284,383 | Elmer | May 26, 1942 |
| 2,388,702 | Pearce | Nov. 13, 1945 |
| 2,440,025 | Singleton | Apr. 20, 1948 |
| 2,496,135 | Sedwitz | Jan. 31, 1950 |
| 2,623,137 | Vogelsberg | Dec. 23, 1952 |